Sept. 9, 1924.
R. W. GOFF
1,508,179
MEANS FOR IMPREGNATING COILS
Filed Sept. 8, 1922
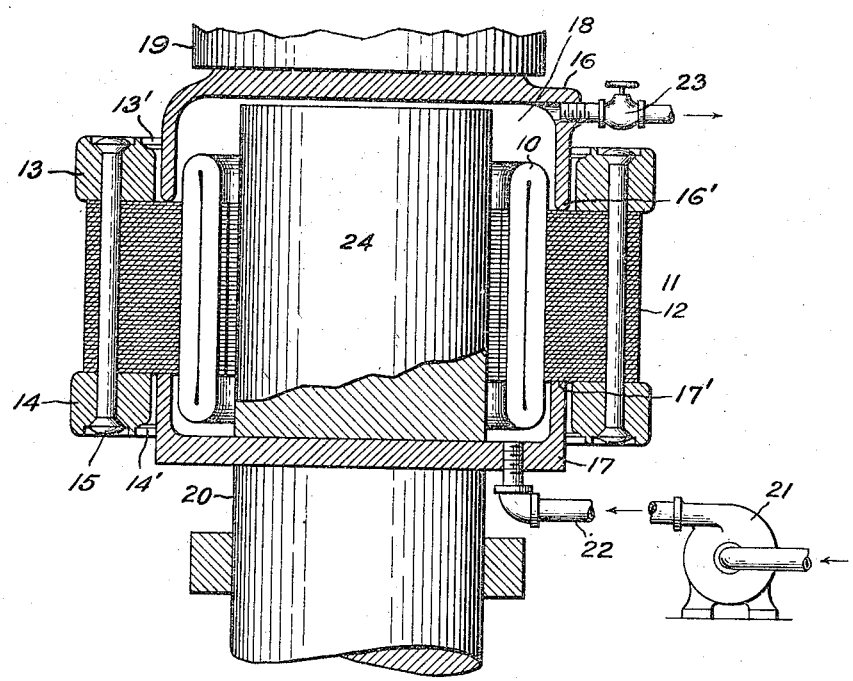
Inventor:
Robert W. Goff,
by Albert G. Davis
His Attorney.

Patented Sept. 9, 1924.

1,508,179

UNITED STATES PATENT OFFICE.

ROBERT W. GOFF, OF SCHENECTADY, NEW YORK, ASSIGNOR TO GENERAL ELECTRIC COMPANY, A CORPORATION OF NEW YORK.

MEANS FOR IMPREGNATING COILS.

Application filed September 8, 1922. Serial No. 586,874.

*To all whom it may concern:*

Be it known that I, ROBERT WILLIAM GOFF, a citizen of the United States, residing at Schenectady, in the county of Schenectady, State of New York, have invented certain new and useful Improvements in Means for Impregnating Coils, of which the following is a specification.

My invention relates to means for impregnating coils, particularly electrical coils after they have been mounted on magnet frames, and has for its object the provision of improved means whereby such coils may be impregnated in a simple, reliable and efficient manner.

Although it obviously has application in the impregnating of the coils of various types of electrical apparatus, my invention is particularly applicable in the impregnating of the field coils of electric motors.

In the construction of electric motors, the field coils are first formed of cotton or other fabric covered conductors, wrapped with cotton or other fabric tape, and then assembled on the magnet or field frame in slots provided for them. After being thus assembled in place on the magnet frame, the coils are treated with a suitable insulating material which may be and often is a varnish, so as to impregnate the fabric on the coils, after which the coils are baked. In this manner the insulating and heat refractory characteristics of the fabric of the coils are improved. Also the coils are stiffened so that their mechanical strength is increased.

The usual method of applying the insulating varnish is to immerse the coils, together with the entire magnet frame, in the varnish for a considerable length of time. With this method it is necessary to wipe off or otherwise remove the varnish which adheres to certain parts of the magnet frame, particularly from the machined parts. The coils together with the frame are then placed in an oven and baked. This method, therefore, results in a considerable waste of labor in removing the varnish from the frame as well as a waste of the varnish removed. Furthermore, with this method a relatively light varnish must be used, and it is therefore necessary to give the coils several applications of varnish, the varnish being removed from the frame and the coils baked after each application. Also with this method the coils must remain immersed in the varnish for a considerable length of time so as to give the varnish a chance to penetrate, particularly around the portions of the coils lying in the slots.

In carrying out my invention I provide means whereby the insulating varnish may be applied only to the coils and such parts of the frame where its removal is unnecessary, and whereby the varnish may be applied under pressure so as to force it quickly into all parts of the coils. By thus causing the varnish to penetrate the coils under pressure, I am enabled to use a relatively heavy varnish so that only one application may be necessary. Furthermore, the varnish may be forced between the laminations of the magnet frame, whereby the laminations are insulated from one another. In one embodiment of my invention I temporarily enclose the coils in a chamber by applying suitable enclosing members to the magnet frame and fill the chamber thus formed with the impregnating material under a suitable pressure.

For a more complete understanding of my invention reference should be had to the accompanying drawing in the single figure of which is shown means for impregnating coils embodying my invention.

Referring to the drawing, I have shown my invention in one form as applied to the impregnation of the motor field coils 10. The field coils 10 are mounted in suitable slots in the annular magnet frame 11 which forms the stator member of the motor. These coils are formed of cotton or other fabric covered electrical conductors, and the conductors in each coil may be wrapped with cotton or other fabric binding material. The construction of the coils and the manner of their mounting on the magnet frame may be in accordance with any suitable construction and is well known in the art. As shown the magnet frame 11 is built up of laminations 12 of magnet core iron, which laminations form the magnet frame proper and constitute part of the path for the magnetic flux set up by the field coils 10. These laminations are clamped rigidly between annular clamping members 13 and 14 by means of bolts or rivets 15 passing therethrough. It will be understood that a suitable rotor member will be inserted in the annular magnet frame so as to cooperate with the field coils 10. The end clamping members 13 and 14 are provided with machined surfaces 13' and 14' respectively which form seats for the end members of the motor carrying bearings for the rotor member.

In impregnating the coils 10 in accordance with my invention I apply two enclosing members 16 and 17 to the sides of the magnet frame so as to enclose the coils 10 in a chamber 18. These enclosing members are shown in the form of cups or caps with their annular edges 16' and 17' adapted to fit on the laminated structure concentrically of and between the clamping members 13 and 14 respectively and the coils 10. By means of a suitable press having clamping jaws 19 and 20, the caps 16 and 17 are forced tightly on the laminations 12 so as to form a tight joint therewith and a sealed chamber 18 for the coils, the clamping jaws engaging the outer faces of the caps. The clamping jaws may be either horizontal or vertical although preferably vertical jaws as shown are used for convenience in operation.

In applying the insulating varnish to the coils, the varnish is forced under pressure by means of a suitable pump 21 into the chamber 18 through an inlet pipe 22 extending through the lower cap 17. An outlet valve 23 is provided in the upper cap 16 whereby the entrapped air may be discharged until the chamber 18 is completely filled with the insulating varnish, after which the valve is closed and the varnish maintained at a suitable pressure so as to impregnate the coils 10. Preferably a heavy varnish is used so that only one application is necessary. After the varnish has been maintained under pressure in the chamber 18 for a sufficient length of time to thoroughly impregnate the coils the chamber is emptied, the caps 16 and 17 removed, and the frame and coils placed in an oven and baked. I have found that with certain types of motors the coil 10 may be thoroughly impregnated with a heavy varnish by maintaining the varnish under a pressure of approximately 175 pounds per square inch for a period of three minutes. The varnish is also forced in between the laminations 12, this result being manifested by a slight oozing of the varnish from between the laminations which appears like perspiration on the outer surface of the laminated structure. A central cylindrical core member 24 may be provided fitting loosely in the chamber 18 so as to decrease the volume of the chamber whereby the time required to fill the chamber with the insulating varnish is reduced. This core 24 may be secured to the lower cap member 17.

By means of my invention, the coils may thus be thoroughly impregnated in a single application, and this single application may be made in a relatively short time, whereby the treatment of the coils is greatly expedited. Since there is no excess varnish to remove, my invention offers a further saving in this respect in both labor and materials. Furthermore, the laminations are coated at the same time so as to be electrically insulated from one another. I have found that coils can be more effectively impregnated by means of my invention than with the usual dipping process, whereby the electrical and mechanical properties of the coils are better than with the dipping process.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention the scope of which is set forth in the annexed claims.

What I claim as new and desire to secure by Letters Patent of the United States, is:

1. Means for impregnating coils mounted on a magnet frame comprising enclosing members placed over the protruding portions of said coils into engagement with said magnet frame on opposite sides thereof so as to form with said magnet frame a chamber for said coils, and means for supplying the impregnated material to said chamber under pressure.

2. Means for impregnating coils mounted on a magnet frame comprising cup shaped enclosing members, means for clamping said members into engagement with opposite sides of said frame so as to form a sealed chamber containing said coils, and means for supplying the impregnated material to said chamber under pressure.

3. Means for impregnating coils mounted on an annular magnet frame comprising cap members placed over the protruding portions of the coils into engagement with said frame on opposite sides thereof so as to form a chamber enclosing said coils, means for clamping said cap members tightly on said frame so as to seal the chamber, and means for supplying the impregnated material to said chamber under pressure.

4. Means for impregnating coils mounted on a magnet frame comprising enclosing members, means for securing said members to said frame so as to form a chamber containing said coils, a core member carried by one of said enclosing members fitting loosely in said chamber so as to reduce the volume thereof, and means for supplying impregnating material to said chamber under pressure.

5. Means for impregnating coils mounted on an annular magnet frame with an insulating varnish comprising cap members adapted to fit on said frame so as to form a chamber enclosing said coils, clamping means for temporarily securing said cap members on said frame, a cylindrical core member in said chamber carried by one of said cap members, and means for supplying the insulating varnish to said chamber under pressure.

In witness whereof, I have hereunto set my hand this 2nd day of September, 1922.

ROBERT W. GOFF